UNITED STATES PATENT OFFICE.

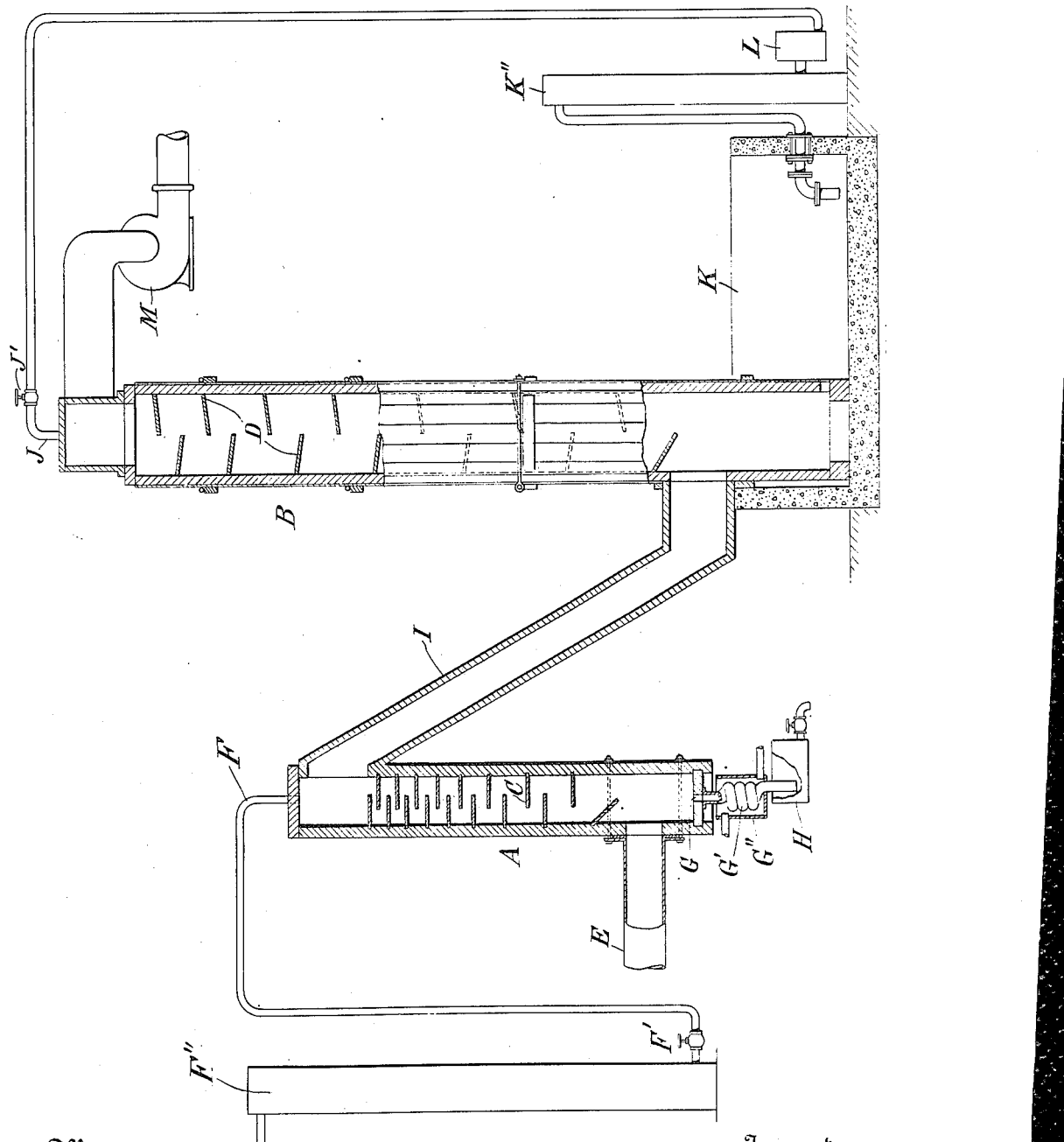

RALPH S. SHERWIN, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA.

APPARATUS FOR CONDENSING AND UTILIZING HYDROFLUORIC ACID.

1,294,546.   Specification of Letters Patent.   Patented Feb. 18, 1919.

Application filed January 13, 1915. Serial No. 1,964.

*To all whom it may concern:*

Be it known that I, RALPH S. SHERWIN, a citizen of the United States, residing at East St. Louis, county of St. Clair, and State of Illinois, have invented certain new and useful Improvements in Apparatus for Condensing and Utilizing Hydrofluoric Acid, of which the following is a full, clear, and exact description.

In the apparatus commonly used for the condensation or absorption of hydrofluoric acid in water the acid vapors from the generator or still are passed through water contained in a closed receptacle and offering such resistance to the passage of the vapors that for practical operation it is necessary to maintain the vapors under pressure. This in turn means that a closed still or retort must be used for the generation of the vapors. Such a still cannot be opened for charging without permitting the escape of acid fumes, which cause great discomfort to the workmen and are injurious to health. Moreover, the process as a whole is intermittent, since the opening of the generator to introduce a fresh charge reduces the pressure to such an extent that the flow of vapor through the condenser or absorber is arrested.

I have accordingly been led to devise my present invention, having for its chief object to provide an improved condenser or absorber which can be operated at a pressure less than atmospheric in connection with a continuous generator or still, such, for example, as is described in the co-pending application of Edwin S. Fickes, Serial No. 828,436, filed March 31, 1914. The production of the acid vapors and their absorption in water in other liquid or solution can then go on continuously, and the generator can be opened whenever necessary without stopping the generation of the acid vapors or their absorption and without permitting the escape of vapors into the atmosphere. To this and other ends the invention consists in the novel features of construction and combinations of elements hereinafter described.

A convenient and effective embodiment of the invention is illustrated in the accompanying drawings, in which the apparatus is shown partly in side elevation and partly in vertical section. It will be understood that the illustration is somewhat diagrammatic in character.

In the preferred embodiment two condensing or absorbing chambers A, B, are employed, one designated the primary and the other the secondary condenser or absorber. Each is in the form of a box made of suitable material, for example wood, elongated vertically and provided with baffles C, D, those in the primary absorber, and if desired those in the other also, being spaced successively farther apart from the top downward. The acid vapors and any other gas or gases mixed therewith enter the primary absorber A at the bottom through a conduit E which is connected with a closed acid-generator or still, not shown. At the top of the absorber A is a water-inlet F, provided with a regulating valve F'. Entering from the conduit E the gases rise and encounter the water flowing over the baffles, which are spaced closer together at the top to compensate for the rapid absorption of the gases and vapors by the water. At the bottom of the absorber A is an outlet G for the acid, discharging through a water seal H. The unabsorbed or undissolved vapors and other gases leave the primary absorber A at the top and are conveyed by a conduit I to the lower part of the secondary absorber B, which has at the top a liquid inlet J provided with a valve J'. Water may be delivered by the latter if desired, but I prefer to employ an alkaline solution, as will be described hereinafter.

In the manufacture of aluminum fluorid, cryolite or other fluorids, it is desirable to have the acid of sufficient strength, or of sufficiently high temperature, to cause it to react readily with the alumina of materials used. Since the absorption of hydrofluoric-acid vapors in water liberates a considerable amount of heat, I am able to obtain the hydrofluoric-acid solution at any desired temperature by properly regulating the supply or temperature, or both, of water to the absorber. By this means, both the sensible heat of the gases and vapors entering the absorber and the heat liberated by the condensation of absorption are utilized for the purpose of bringing the acid solution to any desired temperature. Here the height of the absorber, and the number and spacing of the baffles (successively farther apart from the top downwardly), play an important part, in that by suitable proportioning of these features the absorption with a small quantity of water is increased, thereby giving not only a stronger solution but also giving the solution a higher temperature, thus increasing the efficiency of the solution in the subsequent production of fluorids. By increasing the number of baffles and decreasing the amount of liquid entering at the top the strength of the acid solution in the lower part of the absorber can be carried to a high degree of concentration. This is due in part to the increased absorption of the acid vapors, and in part to the evaporation of the water in the absorber. If the temperature rise is sufficient to cause the acid solution descending in the lower part of the absorber to boil (under the reduced pressure in the absorber) the evaporation will be more rapid, and the concentration, within certain limits, will be greater. A boiling solution of hydrofluoric acid in water may give off both hydrofluoric acid and water vapor, but the vapor is greatly in excess until the acid solution reaches a concentration of about 30 per cent. The evaporation by boiling of the descending stream in the lower part of the condenser has the advantage of removing the excess heat from the liquid, so that it is capable of absorbing more acid from the strong acid vapors entering at the bottom. The water vapor formed in the lower part of the absorber may be condensed in the upper part by the incoming liquid, or part of it may pass into the secondary absorber. If for any reason it is found desirable to keep the solution from boiling, the water can be delivered at a lower temperature. This may at times involve cooling the water, for which purpose the water may pass through a suitable cooling tower or other cooling apparatus F'' before reaching the absorber. The acid solution which collects at the bottom of the absorber may also be cooled, if desired, in any convenient way; as for example by its flow through the coil G' in the vessel G'' through which cold water is circulated. The water-seal H of course allows the acid-solution to pass freely out but prevents the entrance of air.

The non-condensable gases, and any other gases and vapors that are not condensed or absorbed in the primary absorber, pass to the secondary absorber and there encounter a descending stream of a solution of sodium carbonate or other suitable alkaline solution. Here the acid vapors present react with the base of the solution, and the liquid passes out through a liquid-seal into the tank K, whence it is delivered to the supply pipe J by means of a pump indicated diagrammatically at L; old solution being withdrawn from and fresh solution added to that in the tank continuously or intermittently at a suitable rate. The precipitated fluorid also collects in the tank and is removed continuously or intermittently as may be desired, by any convenient means not shown. If a soda solution is used the precipitate is sodium fluorid, which may be used in the manufacture of cryolite or other double fluorid of sodium or aluminum. The gaseous residue passes out of the absorber B at the top thereof, through a suitable exhauster M, and are discharged from a stack not shown; the exhauster serving to create the vacuum, in the absorbers and in the acid-vapor generator, which produces the flow of vapors and gases from the generator through the absorbers. A considerable part of the vapors admitted to the secondary absorber is condensed therein by passing upwardly through the descending stream of alkaline liquid. It may at times happen, however, that the vapors carry so much heat into the secondary absorber (particularly if the solution in the primary absorber is boiling) that the liquid in the secondary becomes too hot, with the result that condensation of the vapor is diminished and too much vapor passes out through the exhauster. In such case the liquid can be cooled in any convenient manner, as by means of a cooling tower K'', through which the liquid flows on its way to the top of the absorber.

The apparatus described is advantageous in that it is well adapted for use with a continuous acid-still or generator, as stated at the outset. It has another and in some respects more important advantage, however. In the manufacture of aluminum fluorid, or cryolite, it has been found exceedingly difficult to precipitate the fluorids completely from the solution resulting when hydrofluoric acid is neutralized with aluminum hydrate, sodium hydrate, or other materials containing alumina or soda. If dilute solutions of fluorids, resulting from the manufacture of aluminum fluorid or cryolite, are returned to condensers of the prior types, in which the hydrofluoric acid-vapors are passed through the water solution in the tank a precipitate is formed which clogs the vapor pipes and renders the operation of the still dangerous. In the present invention the vapors do not pass through a body of liquid in a tank but through a stream of water or solution, and any precipitate formed is washed down, and off the baffles, by the continuous stream and passes out through the water seal at the bottom.

It is to be understood that the invention is not limited to the specific apparatus herein described, but can be embodied in other forms without departure from its spirit. The process or method described herein will be claimed in a subsequent application.

I claim:

1. An apparatus for condensing hydrofluoric acid, comprising in combination, a series of vertical absorbers connected for the flow of vapor through them in series from the bottom to the top of each, a series of transverse baffles arranged in at least one of the absorbers, and spaced successively farther apart from the top of the absorber downward, suction-means for producing a flow of vapor, means for delivering a stream of liquid into the top of each absorber, and liquid seals for the absorbers at the bottoms thereof.

2. An apparatus for condensing hydrofluoric acid, comprising in combination, a plurality of vertical absorbers connected for the flow of vapor through them in series from the bottom to the top of each, a series of transverse baffles arranged in at least one of the absorbers, and spaced successively farther apart from the top of the absorber downward, suction-means at the outlet end of the series to produce the flow of vapor, means for delivering water into the top of the first absorber of the series, means at the bottom thereof for discharging liquid without admitting air into said first absorber, means for circulating a reagent in solution downwardly through a succeeding absorber, and means at the bottom of such succeeding absorber for discharging liquid and solid products without admitting air to the absorber.

3. An apparatus for absorbing hydrofluoric acid comprising a first absorbing tower made of material resistant to hydrofluoric acid, baffles located therein adapted to break up and subdivide the liquid falling through such tower, a liquid inlet at the top of said tower and a liquid outlet at the bottom thereof, said inlet and outlet being entirely independent of each other, and means for independently cooling the inlet and outlet liquids, a gas inlet near the lower part of said tower and a gas outlet near the upper part thereof, a second absorption tower having baffles therein, means for introducing an absorbing liquid to said second tower, means for withdrawing liquid from said second tower to a separate vessel, and for reintroducing said liquid to said second tower.

4. An apparatus for condensing hydrofluoric acid, comprising in combination, a vertical primary absorber having at the bottom an inlet for vapor, means for discharging liquid into the top of the primary absorber, a series of baffles in the primary absorber over which the liquid flows, and which are spaced successively farther apart from the top of the absorber downward, means at the bottom of the primary absorber for discharging liquid without admitting air, a secondary absorber, a conduit conveying vapor from the top of the primary absorber to the bottom of the secondary absorber, a series of baffles in the secondary absorber, means for withdrawing liquid from the bottom of the secondary absorber and delivering the same into the top thereof, and an exhauster connected to the top of the secondary absorber for drawing vapor through both absorbers in series.

5. An apparatus for absorbing hydrofluoric acid comprising a first absorbing tower made of material resistant to hydrofluoric acid, baffles located therein adapted to break up and subdivide the liquid falling through such tower, the baffles being spaced farther apart in the lower part of the said tower than in the upper part thereof, a regulable liquid inlet at the top of said tower and a liquid outlet at the bottom thereof, and means for independently cooling the inlet and outlet liquids, a gas inlet near the lower part of said tower, but above the bottom thereof, and a gas outlet near the upper part thereof, a second absorption tower having baffles therein, means for introducing an absorbing liquid to said second tower, means for withdrawing liquid from said second tower to a separate open vessel, and for cooling and reintroducing said liquid to said second tower.

6. An apparatus for absorbing hydrofluoric acid comprising a first absorbing tower made of material resistant to hydrofluoric acid, baffles located therein adapted to break up and subdivide the liquid falling through such tower, a liquid inlet at the top of said tower and a liquid outlet independent of said inlet, at the bottom thereof, and means for independently cooling the inlet and outlet liquids, a gas inlet near the lower part of said tower and a gas outlet near the upper part thereof, a second absorption tower having baffles therein, means for introducing an absorbing liquid to said second tower, means for withdrawing liquid from said second tower to a separate vessel, and for reintroducing said liquid to said second tower and suction-producing means for drawing the hydrofluoric-acid-containing gas through the absorption towers under less than atmospheric pressure.

7. In an apparatus for condensing hydrofluoric acid, an absorber comprising an upright chamber having an opening at the bottom for admission of the acid vapor, a series of transverse baffles arranged in the chamber and spaced successively farther apart from the top of the chamber downward, an outlet at the top of the chamber, suction means connected with said outlet, said means being capable of drawing vapor through the absorber and capable of maintaining a pressure therein less than atmospheric, means for delivering a stream of absorbing liquid into the top of the chamber, and means at the bottom of the chamber for collecting the acid-laden liquid.

In testimony whereof I affix my signature in the presence of two subscribing witnesses.

RALPH S. SHERWIN.

Witnesses:
   H. P. HELMER,
   R. E. HANLEY.